United States Patent [19]

Weinhold

[11] Patent Number: 5,632,299
[45] Date of Patent: May 27, 1997

[54] WATER AND STEAM MIXING DEVICE

[76] Inventor: Karl Weinhold, Im Jagdfeld 43, 41464 Neuss, Germany

[21] Appl. No.: 388,795

[22] Filed: Feb. 15, 1995

[30] Foreign Application Priority Data

Feb. 25, 1994 [DE] Germany .............. 44 06 222.2

[51] Int. Cl.⁶ ............................................... G05D 11/13
[52] U.S. Cl. .................. 137/111; 137/114; 137/607; 137/614.17
[58] Field of Search ................ 137/88, 100, 111, 137/113, 114, 614.17, 607; 236/12.1

[56] References Cited

U.S. PATENT DOCUMENTS

| | | | |
|---|---|---|---|
| 3,626,966 | 12/1971 | Vanagas | 137/100 |
| 4,033,370 | 7/1977 | Egli | 137/625.17 X |
| 4,085,766 | 4/1978 | Weigl et al. | 137/88 |
| 4,359,186 | 11/1982 | Kiendl | 137/88 X |
| 4,473,088 | 9/1984 | Dotter | 137/111 X |

FOREIGN PATENT DOCUMENTS

| | | |
|---|---|---|
| 35118 | 1/1965 | Germany. |
| 3525141 | 1/1987 | Germany. |
| 704235 | 2/1954 | United Kingdom. |
| 824965 | 12/1959 | United Kingdom. |

*Primary Examiner*—Stephen M. Hepperle
*Attorney, Agent, or Firm*—Lockwood, Alex, FitzGibbon & Cummings

[57] ABSTRACT

The invention relates to a device for the mixing of water and steam introduced via seperate closable supply lines into a mixing vessel wherein the water-to-steam ratio can be changed and wherein the steam supply can be automatically stopped if the water pressure drops below a given value.

10 Claims, 2 Drawing Sheets

WATER AND STEAM MIXING DEVICE

BACKGROUND OF THE INVENTION

The chemical industry uses steam taps and steam guns for saturated steam up to a maximum temperature of 200° C. However, there is also a need for water/steam mixing and an apparatus producing such a mixture from the individual components water and steam, which can then be applied by means of a gun. Such a water and steam mixture must have a temperature of 200° C. at the most. At higher temperatures than 200° C. there is a risk that the supply hoses will tear and that local overheatings or burning will occur.

It is therefore an object of the invention to provide a water and steam mixing device which ensures that the mixture never exceeds a given temperature, such as approximately 200° C.

SUMMARY OF THE INVENTION

This problem is solved by a device for the mixing of water and steam which is connected to a safety valve into which the supply lines for water and steam discharge and in which a valve is disposed which is actuated by the cooling water pressure and which interrupts the steam supply when the water supply is absent, wherein a casing has a cylindrical bore containing a positively inserted axially displaceable piston and which has, moulded-on or attached transversely of the axis of its bore, a spigot for steam and at an axial distance therefrom a further spigot for water, while the wall of the casing and a cylinder positively inserted in its bore are formed with openings on the steam side and openings on the water side which in the opening position are in alignment with openings in the piston on the steam side and openings in the piston on the water side and which do not register with one another in the closure position of the piston, the device also being characterized by a valve which is inserted coaxially and positively into an axial bore of the piston and can be axially displaced in relation thereto and whose head portion is subjected to the water pressure, its opposite end experiencing the pressure of a spring which when the water pressure is absent pushes the valve against an end stop into the closure position, in which the valve cuts off the flow of steam through the openings in the piston, while when the water pressure is present the valve is displaced against the force of the spring into the opening position, in which it allows the steam to flow through the piston openings, whereby the piston openings are so arranged that the water-to-steam mixing ratio can be changed. To this end more particularly the cross-sections of the openings for steam are larger than those in the supply spigot for steam, so that a further displacement of the piston beyond the actual opening position reduces the opening for water, while it remains unchanged on the steam side. As a result, the quantity of water is reduced with a constant quantity of steam.

The device according to the invention solves the problem underlying the invention, since when the water supply is interrupted—i.e., when there is a risk that the steam will not be cooled to below the given maximum temperature by the admixture of cold water—, the valve automatically cuts off the steam supply. The valve is therefore controlled by the water pressure. The valve is moved by the water pressure into its opening position, in which steam can enter the mixing chamber. However, if the water pressure drops, a return spring ensures that the valve automatically moves back into the closure position, in which the steam supply to the mixing vessel is interrupted.

A prefered embodiment of the device according to the invention forms a constructional unit comprising the device and the safety valve.

Also according to the invention in the opening position the valve interconnects by its central portion of reduced diameter the openings in the piston.

For the opening and closure of the water and steam supply lines, therefore, use is made of a piston which is axially displaceable in the casing and which is formed with separate openings for water and steam arranged in such a way that during the transition from the closure to the opening position, first it releases the opening for water and then the one for steam. Coaxially disposed in the piston is a valve which when its head surface is acted upon by water pressure can be axially displaced against the pressure of a return spring. The central portion of the valve is formed with a passage for water which in the opening position of the valve is in alignment with the opening in the piston for steam.

This construction according to the invention combines the advantages of a simple design with smooth operation, simple operability and reliable function, while more particularly it operates reliably when the water pressure falls.

The piston is disposed to be horizontally reciprocated by means of a handwheel or a motor in the casing in the cylinder inserted coaxially therein. Preferably the cylinder is axially fixed in the casing via the nipple for the supply of steam and/or cold water by the nipple engaging in a radial bore in the cylinder. This facilitates the assembly of the cylinder in the casing. Preferably the cylinder is secured against rotation by a pin. Basically the cylinder can be dispensed with if the casing bore takes the form of a cylinder.

The piston can be given an axial movement by a rotatable handwheel which cannot move axially. Alternatively, this can also be done by means of an electric motor which can be controlled by a temperature sensor measuring, for example, the water/steam mixing temperature. The mixing temperature can be controlled in this way; when the mixing temperature rises, the axial displacement in the piston in the cylinder triggered by the temperature sensor increases the water opening, thus increasing the water component of the water/steam mixture, so that the mixing temperature is again lowered to the required value. When the mixing temperature drops below the required value, the water opening in the casing is reduced by the axial displacement of the piston, so that the water component is reduced in relation to the steam component of the mixture, as a result of which the mixing temperature again rises to the required value.

In another preferred feature of the device according to the invention, downstream of the valve in the direction of flow a nozzle for steam is inserted in the casing portion moulded on the valve casing, with the formation of an annular space through which water flows. Another possible feature is that a mixing vessel receiving the water/steam mixture is provided which is flanged to the casing portion and has a spigot for the connection of the supply hose to the spraygun.

Preferably Viton sealing rings are inserted on the cold water side and Teflon sealing rings on the steam side.

BRIEF DESCRIPTION OF THE DRAWINGS

The invention will now be described in greater detail with reference to the embodiment thereof illustrated in the drawings, which show.

In the drawings like elements have like references.

DETAILED DESCRIPTION OF THE PREFERRED EMBODIMENT

Figure 1:
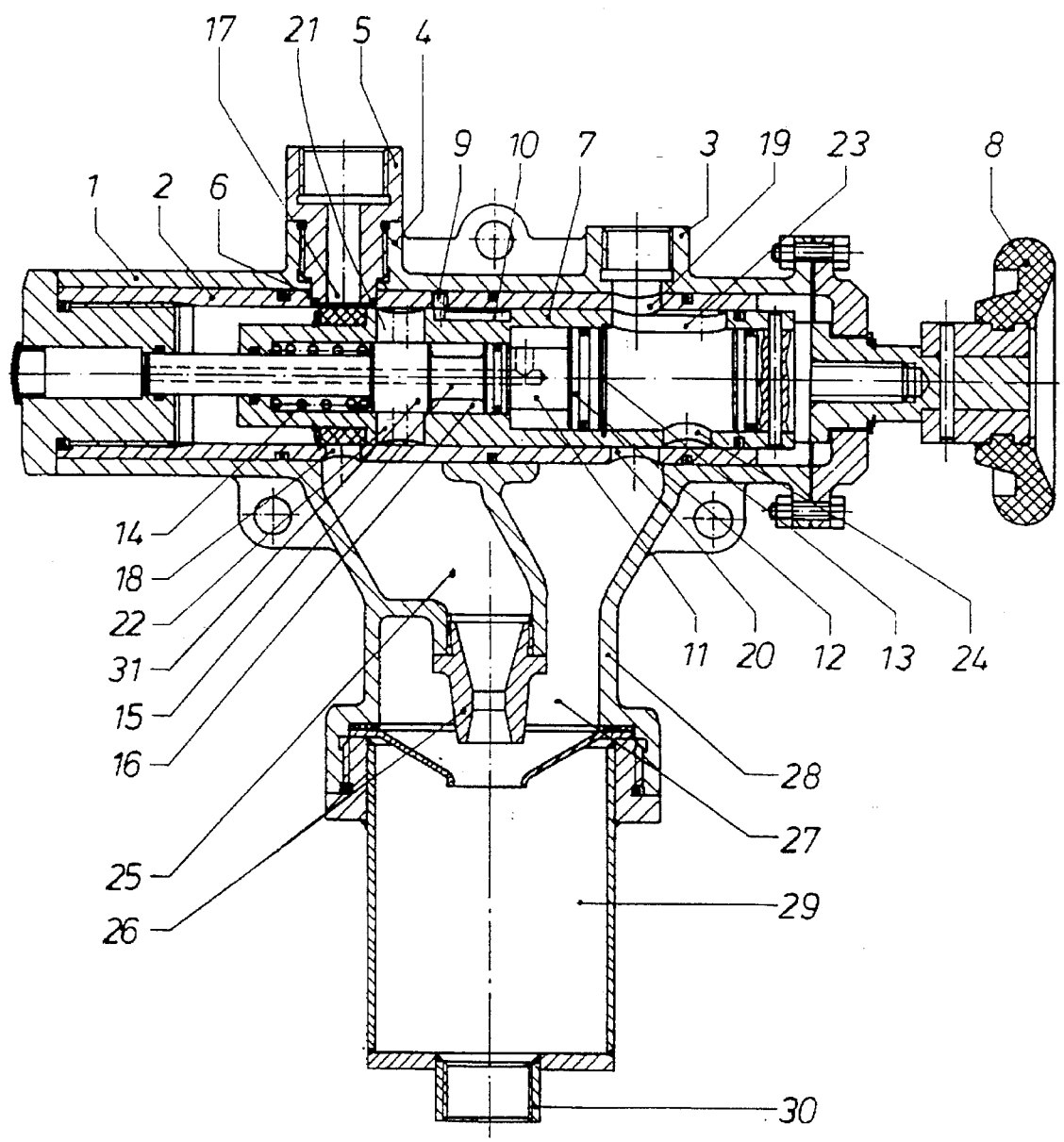
FIG. 1 is a longitudinal section through the device according to the invention in the valve closure position.

As shown in the general view in FIG. 1, the device according to the invention comprises a casing 1 into whose cylindrical cavity a mantle-type cylinder 2 is positively inserted and sealed off by sealing rings from the inner wall of the casing 1. Radially formed on the casing 1 are two axially spaced-out spigots 3 and 4, the former for the connection of a water line and the latter for the connection of a steam line. Inserted in the spigot 4 is a nipple 5 whose end portion engages in a radial bore 6 of corresponding size in the generated surface of the cylinder 2, thereby fixing the cylinder 2 axially in the casing 1.

A piston 7 is disposed positively and coaxially in the cylinder 1 and can be horizontally reciprocated therein by means of a handwheel 8. The end positions of the piston 7 are limited by a groove 10 with which the piston 7 is formed and in which a pin 9 inserted in the wall of the cylinder 2 engages by its portion extending beyond the inside wall of the cylinder 2. The length of the groove 10 thus corresponds to the path of travel of the piston 7 in the cylinder 2.

A valve 11 is mounted for axial displacement in the piston 7 coaxially with the casing 1, the cylinder 2 and the piston 7. The valve 11 has a widened head portion 12 which bears as a stop against a Seeger circlip ring is limiting its displacement to the right in the closure end position shown in FIG. 1. The valve 11 is forced to the right into this end position by a compression spring 14. The central portion 15 of the valve 11 is stepped with reduced diameter, with the formation of an annular gap 16 between said central portion 15 and the opposite wall of the piston 7.

The wall of the cylinder 2 is formed respectively with two diametrically opposite openings 17, 18 on the steam side and 19, 20 on the water side. Similarly, diametrically opposite openings 21, 22 on the steam side and 23, 24 on the water side are provided in pairs in the piston 7. The openings 21, 22 on the steam side in the piston 7 have a larger cross-section than the openings 17, 18 in the cylinder 2. The opening 23 in the piston 17 on the water side is larger than the opening 19 in the cylinder on the water supply side, while the water side openings 20, 24 in the piston 7 and the cylinder 2 have an identical size of cross-section on the water discharge side. The purpose of this dimensioning of the openings 17 to 24 will be further explained hereinafter.

The steam side opening 18 in the cylinder discharges into a widened expansion space 25 in casing portion 28, to which a nozzle 26 is attached which the steam passes through during its acceleration. An annular space 27 through which water flows is formed around the nozzle 26. The steam emerging at increased velocity from the nozzle entrains water from the annular space 27 and eddies therewith turbulently, with the formation of saturated steam. Flanged to the casing portion 28 containing the nozzle 26 is a mixing vessel 29 which has a nipple 30 for the connection of a spraygun hose.

The aforementioned parts of the device are sealed on the steam side by Viton rings, while Teflon sealing rings are inserted on the cold water side.

The casing 1 can be preferably made from cast aluminium, while the cylinder 2, piston 7 and valve 11 are made of special steel.

The water and steam mixing device according to the invention operates as follows:

FIG. 1 shows the device with the piston 7 in the closure position. In this position the piston 7 closes on the steam side both the opening 17 on the inlet side and also the opening 18 on the outlet side in the cylinder 2. On the water side the piston 7 has closed the water outlet opening 20 in the cylinder 2. Neither steam nor water can therefore flow through the casing 1.

To open the passages for water and steam, first shutoff members provided in the steam and water supply lines (not shown) are opened. As a result, steam passes through the nipple 5 as far as the closed opening 17 in the casing 1 and water passes via the spigot 3, the openings 19 in the cylinder 2 and the opening 23 in the piston 7 into the interior of the piston. The water pressure then acts on the head portion 12 of the valve 11 and produces a displacement of the valve 11 to the left as shown in the drawing against the pressure of the end side spring 14, until the central portion 15 of the valve 11 of reduced diameter is in alignment with the openings 21 and 22 of the piston 7 on the steam side. As a result, a passage is formed by the opening 21 with the annular space 16 around the central portion 15 of the valve 11 of reduced diameter and the opening 22. In this condition, however, the water and steam sides are still closed and the passage for both media through the valve casing 1 is blocked.

Figure 2:
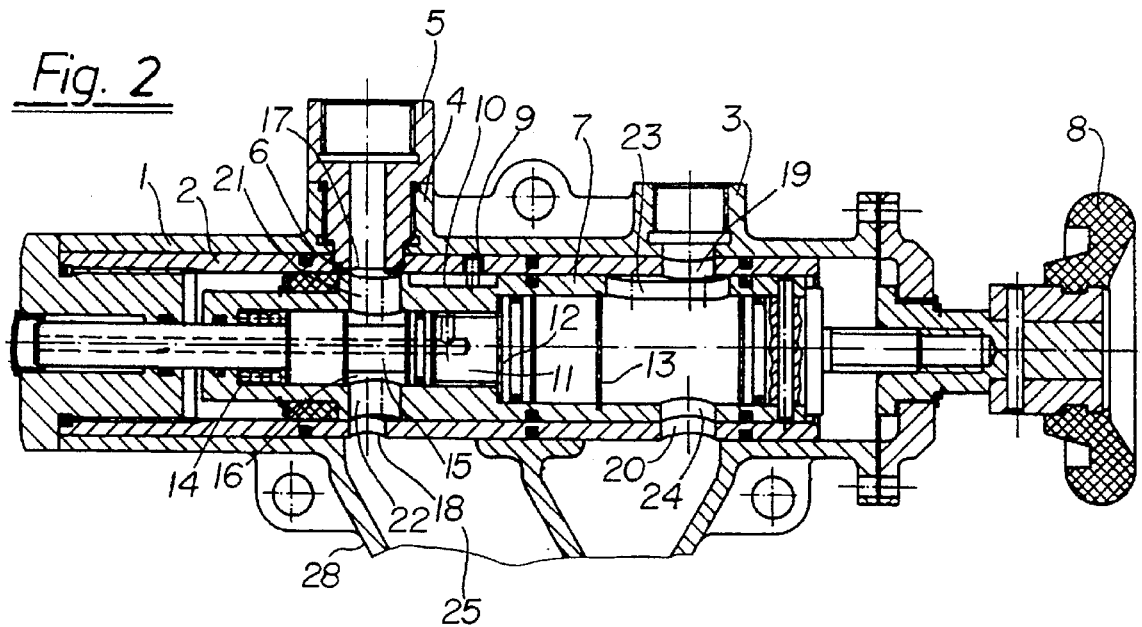
FIG. 2 is a longitudinal section of the valve casing to an enlarged scale in the opening position.

To now produce an opening of the passages, the piston 7 is gradually displaced by rotating the handwheel 8 out of the closure position shown in FIG. 1 in the axial direction in the fixed cylinder 2 and the casing 1 in the direction to the right as shown in the drawing into the opening position shown in FIG. 2. In that position, on the steam side the openings 17 are now in alignment via the passage 21, 16, 22 with the outlet opening 18, while on the water side the outlet openings 24 in the piston 7 are in alignment with the opening 20 in the cylinder 2. Now both steam and water can pass through the casing. The steam passes into the expansion space 25 in the casing portion 28, is accelerated in the nozzle 26 and entrains water from the surrounding annular space 14 into the mixing vessel 29, from which the saturated steam can then flow via the spigot 30 into the hose to the spraygun.

If now for any reason the water flow is absent, the water pressure inside the piston drops. Thereafter due to the absence of the water counter pressure the compression spring 14 can expand and pushes the valve 11 to the right as shown in the drawing as far as the stop formed by the Seeger circlip ring 13. During this movement the portion 31 of the valve 11 which adjoins the central portion 15 of reduced diameter is pushed over the openings 21 and 22 in the piston 7 as far as the full registration and separation thereof, as can again be seen in FIG. 1. The passage on the steam side is therefore blocked, although the openings 21 and 22 in the piston are still in alignment with the openings 17 and 18 in the cylinder 2. This ensures that steam can never pass through the valve casing when the water flow is absent. The valve 11 then automatically ensures the closure of the passage for steam through the casing 1.

Figure 3:
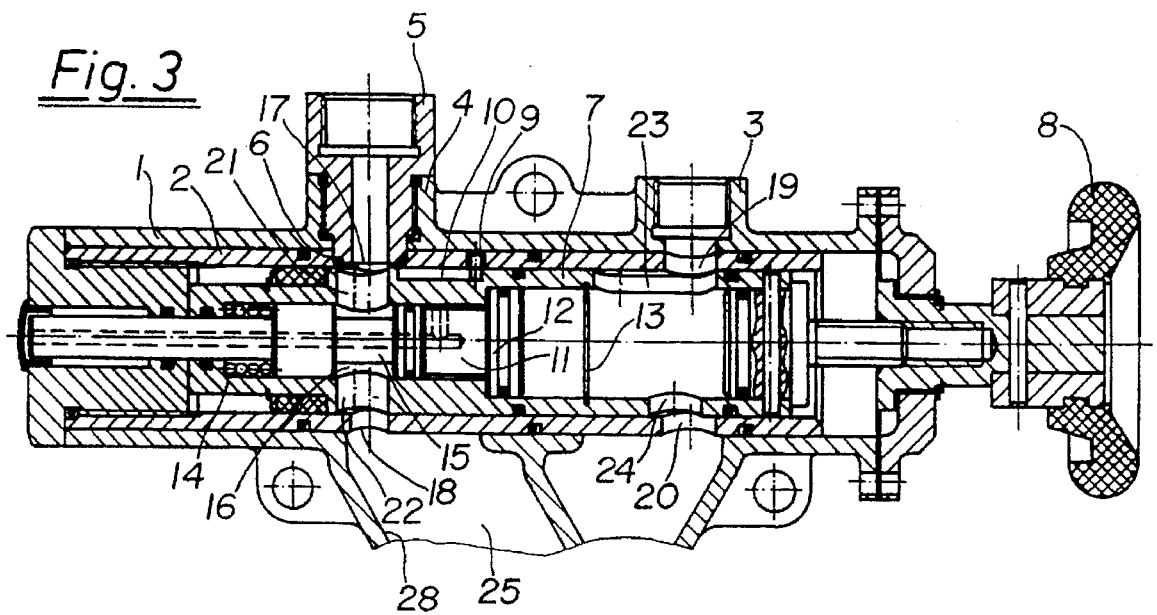
FIG. 3 is a longitudinal section of the valve casing showing the piston in a position in which the water supply is throttled.

If the mixture of water and steam is not hot enough, the piston 7 can be displaced beyond the opening position shown in FIG. 2 further to the left with reference to the drawing, into the end position shown in FIG. 3. In that position a passage cross-section for the steam has remained unchanged, while on the water side the quantity of water is reduced by the partial overlapping of the outlet openings 24 and 20 in the piston 7 and the cylinder 2 respectively. As a result the proportion of steam is increased correspondingly, the result being an increase in the temperature of the mixture of water and steam.

I claim:

1. A device for the mixing of water and steam which includes:

a safety valve into which supply lines for water and steam discharge and including a valve in said safety valve which is actuated by cooling water pressure and which interrupts the steam supply when the water supply is absent, and a valve casing having a cylindrical bore containing an axially displaceable piston therein;

a first spigot for steam on said casing and extending transversely of the axis of said bore, and a second spigot for water spaced axially of said first spigot on said casing;

a cylinder in said bore and formed with openings on the steam side and openings on the water side which in an open position are in alignment with openings in the piston on the steam side and openings in the piston on the water side, and which openings in the cylinder and piston respectively do not register with one another in a closed position of the piston;

said piston having an axial bore;

a valve inserted coaxially into said axial bore of the piston and axially displaceable in relation thereto;

a head portion on said valve which is subjected to the water pressure; and a spring on the end of said piston opposite said head portion which, when the water pressure is absent, pushes the valve into the closed position against an end stop so that the valve cuts off the flow of steam through the openings in the piston, and when the water pressure is present the valve is displaced against the force of the spring into the open position to permit the steam to flow through the piston openings, whereby the piston openings are so arranged that the water-to-steam mixing ratio can be changed.

2. A device according to claim 1, wherein said safety valve is integral with the device.

3. A device according to claim 2, including a nozzle for steam downstream of the valve in a casing portion moulded on the valve casing, and an annular space in the casing portion through which water flows.

4. A device according to claim 3, including a mixing vessel positioned downstream of said nozzle for receiving the water/steam mixture, and a spigot on said vessel for the connection of a supply hose to a spraygun.

5. A device according to claim 1, wherein the valve has a central portion of reduced diameter which, in the open position, interconnects the piston openings for the steam.

6. A device according to claim 1, wherein the cylinder is axially fixed in the casing by a nipple for the supply of steam and/or cold water by the nipple, and the nipple engages the cylinder.

7. A device according to claim 1, wherein Viton sealing rings are positioned on the water side and Teflon sealing rings are positioned on the steam side of the piston.

8. A device according to claim 1, wherein the valve casing is formed of cast aluminum and the cylinder, piston and valve are formed of specialty steel.

9. A device according to claim 1, wherein the piston is secured against rotation by a pin.

10. A device according to claim 1, wherein the piston is axially displaceable by a rotatable non-axially movable hand wheel.

* * * * *

UNITED STATES PATENT AND TRADEMARK OFFICE
CERTIFICATE OF CORRECTION

PATENT NO. : 5,632,299
DATED : May 27, 1997
INVENTOR(S) : Karl Weinhold

It is certified that error appears in the above-indentified patent and that said Letters Patent is hereby corrected as shown below:

On the Cover Page, Col. 2, after the last of the "FOREIGN PATENT
   DOCUMENTS" insert
   --OTHER INFORMATION
      Japanese Patent Application Abstract  JP 4341675--.
Col. 3, line 30, delete "is" and insert --13--.
Col. 4, line 39, delete "14" and insert --27--.
Col. 5, line 16, delete "formed with" and insert --axially fixed in
   said casing, said cylinder having--; lines 29-30, delete "on the
   end of said piston opposite said head portion" and insert
   --exerting a force on said valve which--.

Signed and Sealed this

Second Day of December,1997

Attest:

BRUCE LEHMAN

*Attesting Officer*   *Commissioner of Patents and Trademarks*